(12) United States Patent
Lewandowski

(10) Patent No.: US 9,611,166 B2
(45) Date of Patent: Apr. 4, 2017

(54) GLASS QUENCH APPARATUS

(71) Applicant: Glasstech, Inc., Perrysburg, OH (US)

(72) Inventor: Troy R. Lewandowski, Maumee, OH (US)

(73) Assignee: GLASSTECH, INC., Perrysburg, OH (US)

( * ) Notice: Subject to any disclaimer, the term of this patent is extended or adjusted under 35 U.S.C. 154(b) by 12 days.

(21) Appl. No.: 14/504,731

(22) Filed: Oct. 2, 2014

(65) Prior Publication Data
US 2016/0096766 A1   Apr. 7, 2016

(51) Int. Cl.
*C03B 27/04* (2006.01)
*C03B 27/044* (2006.01)

(52) U.S. Cl.
CPC ...... *C03B 27/0404* (2013.01); *C03B 27/0442* (2013.01)

(58) Field of Classification Search
CPC ............ C03B 27/0404; C03B 27/0408; C03B 27/0445; C03B 27/0413; C03B 27/048
See application file for complete search history.

(56) References Cited

U.S. PATENT DOCUMENTS 3,353,946 A * 11/1967 McMaseter ......... C03B 27/0404
                                                    65/114
4,225,333 A *  9/1980 Frank ................... C03B 27/0445
                                                    65/273
4,397,672 A    8/1983 Nitschke
4,470,838 A    9/1984 McMaster et al.
4,515,622 A    5/1985 McMaster et al.
4,525,193 A    6/1985 MaMaster et al.
4,620,864 A   11/1986 McMaster
4,681,616 A    7/1987 McMaster
4,711,655 A   12/1987 Schultz
4,913,720 A    4/1990 Gardon et al.
4,946,491 A    8/1990 Barr
5,011,525 A    4/1991 McMaster
5,085,580 A    2/1992 Reunamaki
5,273,568 A   12/1993 McMaster et al.
5,700,306 A   12/1997 Maltby, Jr. et al.
5,917,107 A    6/1999 Ducat et al.
5,931,981 A    8/1999 McMaster et al.
5,938,808 A    8/1999 McMaster et al.

(Continued)

OTHER PUBLICATIONS

PCT International Search Report and Written Opinion of the International Searching Authority Dated Dec. 17, 2015, Application No. PCT/US2015/053676, Applicant Glasstech, Inc., 10 Pages.

*Primary Examiner* — Queenie Dehghan
(74) *Attorney, Agent, or Firm* — Brooks Kushman P.C.

(57) ABSTRACT

A glass quench apparatus according to the present disclosure includes lower and upper quench heads configured to supply upward and downward gas flows to a heated glass sheet, and each quench head has multiple quench fins for distributing gas. For each quench head, adjacent quench fins are spaced apart center to center by a distance in the range of 0.87 to 1.15 inches, and each quench fin has multiple outlet openings that each have a diameter in the range of 0.25 to 0.36 inches. Furthermore, for each quench fin, the outlet openings are configured to provide spaced apart impingement points on the glass sheet such that adjacent impingement points are spaced apart by a distance in the range of 0.82 to 1.15 inches.

23 Claims, 6 Drawing Sheets

(56) References Cited

U.S. PATENT DOCUMENTS

| | | | |
|---|---|---|---|
| 5,968,220 A | 10/1999 | McMaster et al. | |
| 6,045,358 A | 4/2000 | Kormanyos | |
| 6,155,822 A | 12/2000 | Lewandowski | |
| 6,295,842 B1 | 10/2001 | McMaster | |
| 8,028,543 B2 * | 10/2011 | Carlomagno | C03B 27/0404 65/104 |
| 8,074,473 B2 | 12/2011 | Nitschke et al. | |
| 2006/0191292 A1 | 8/2006 | Carlomagno | |
| 2008/0127678 A1 | 6/2008 | Nitschke et al. | |
| 2015/0158757 A1 * | 6/2015 | Amma | C03B 27/0404 428/220 |

* cited by examiner

GLASS QUENCH APPARATUS

TECHNICAL FIELD

The disclosure relates to apparatuses for quenching heated glass sheets in connection with glass processing operations.

BACKGROUND

In order to improve heat transfer capability of glass sheet quench apparatuses, a prior strategy taught to increase system pressures. Additional strategies led to an increase in the ratio of inlet area to outlet area, as well as an increase in the ratio of exhaust area to outlet area, in order to provide suitable gas flows during quenching operations.

One prior quench apparatus includes lower and upper quench heads that each have multiple quench fins. The quench fins are spaced apart center to center by 1 inch, and each quench fin has multiple outlet openings that each have a diameter of 0.3125 inches. Furthermore, for each quench fin, the outlet openings are configured to provide spaced apart impingement points on a glass sheet positioned between the quench heads such that adjacent impingement points are spaced apart by a distance of 1.25 inches when the quench heads are spaced apart by 4 inches. This prior quench apparatus has an inlet area to fin outlet area ratio of 6.10 to 1 for each quench fin, and an exhaust area to head outlet area of 7.74 to 1 for each quench head.

Additional prior apparatuses for quenching glass sheets are disclosed in U.S. Pat. Nos. 5,917,107 and 8,074,473, for example.

SUMMARY

A glass quench apparatus according to the present disclosure includes lower and upper quench heads configured to supply upward and downward gas flows to a heated glass sheet, and each quench head has multiple quench fins for distributing gas. For each quench head, adjacent quench fins are spaced apart center to center by a distance in the range of 0.87 to 1.15 inches, and each quench fin has multiple outlet openings that each have a diameter in the range of 0.25 to 0.36 inches. Furthermore, for each quench fin, the outlet openings are configured to provide spaced apart impingement points on the glass sheet such that adjacent impingement points are spaced apart by a distance in the range of 0.82 to 1.15 inches.

Embodiments according to the present disclosure may actually provide similar or improved heat transfer capabilities compared to prior quench apparatuses, but at lower operating pressures. Furthermore, embodiments according to the present disclosure may have an inlet area to fin outlet area ratio and/or an exhaust area to head outlet area ratio respectively lower than the above ratios.

While exemplary embodiments are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 1 is a schematic side view of one embodiment of a glass processing system for processing glass sheets, wherein FIG. 1 shows a heating station, a bending station, a quench station and a cooling station of the glass processing system;

DETAILED DESCRIPTION

As required, detailed embodiments are disclosed herein; however, it is to be understood that the disclosed embodiments are merely exemplary and that various and alternative forms may be employed. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. Furthermore, as those of ordinary skill in the art will understand, various features of the embodiments illustrated and described with reference to any one of the Figures may be combined with features illustrated in one or more other Figures to produce embodiments that are not explicitly illustrated or described. In addition, other embodiments may be practiced without one or more of the specific features explained in the following description.

During manufacture of a glass sheet product, such as a vehicle windshield, rear window, a glass mirror panel for a solar power collection application, or any other suitable product, it may be desirable to quench a sheet of glass after a heating and/or bending operation in order to temper the glass sheet. In the present disclosure, an improved apparatus is provided for performing such a quench operation. The disclosed apparatus may enable a more efficient quench operation, for example.

Figure 1:
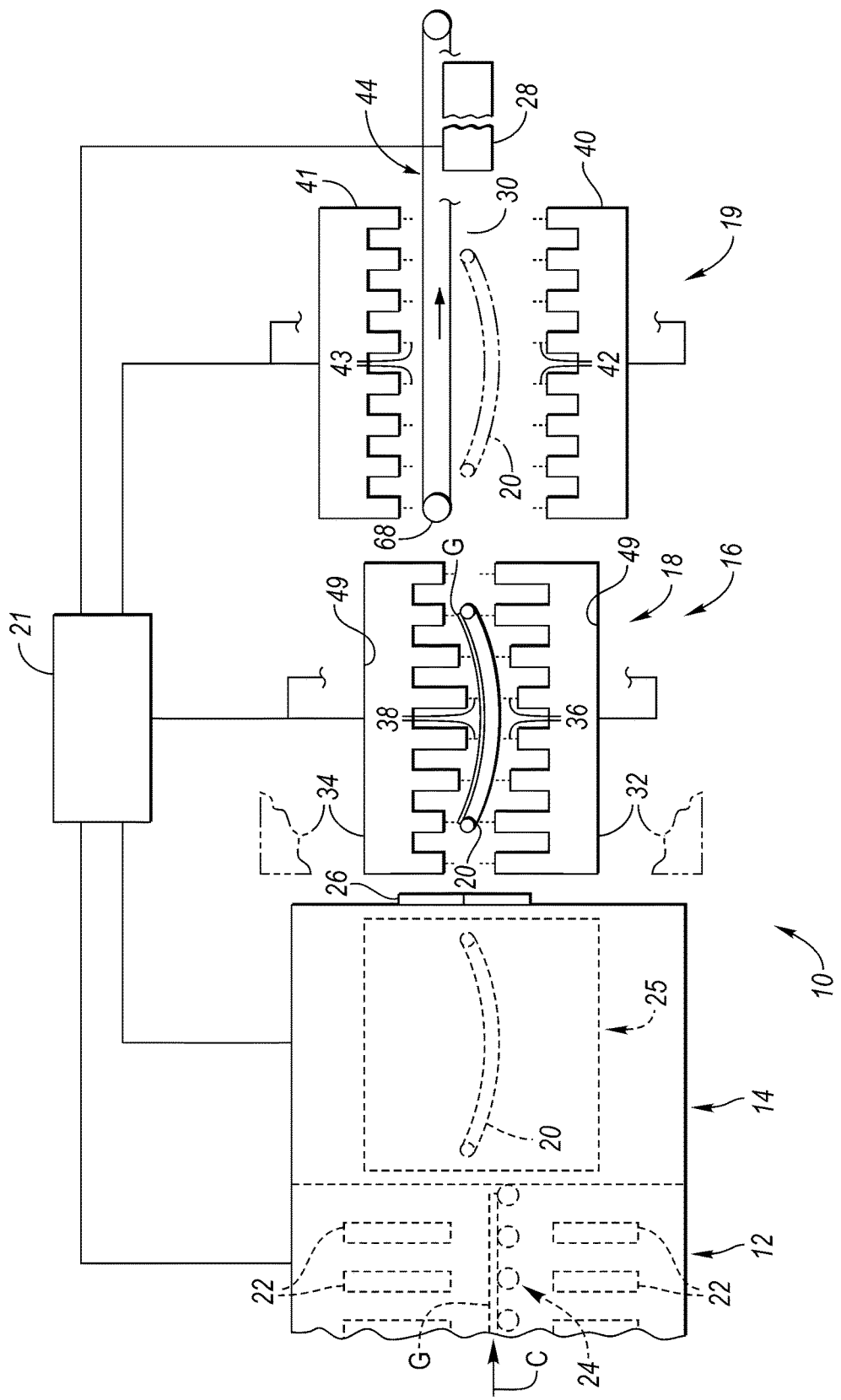

Referring to FIG. 1, a glass processing system 10 is shown for processing glass sheets G. The system 10 includes a heating apparatus or station, such as a furnace 12, for heating the glass sheets G; a forming or bending station 14 for bending each glass sheet G into a desired shape; a quench station 16 including a glass sheet quench apparatus 18, according to the present disclosure, for quenching glass sheets G after the heating and bending operations; and an exit cooling station or aftercooler 19 for further cooling of the glass sheets G. The glass processing system 10 may also include a support member, such as a quench ring 20, for supporting and moving each glass sheet G between the bending station 14, the quench station 16 and the exit cooling station 19, and a control system 21 for controlling operation of the various components of the glass processing system 10.

The furnace 12 may have any suitable configuration for heating the glass sheets G. For example, the furnace 12 may include any suitable heating elements 22 positioned above and/or below a conveyor system 24, which may be used to convey the glass sheets G along a plane of conveyance C through the furnace 12. As a more detailed example, the heating elements 22 may include radiant heating elements, such as electric heaters, and/or convective heating elements, such as hot gas or hot air distributors.

Likewise, the bending station 14 may have any suitable configuration for bending each glass sheet G into a particular shape. For example, the bending station 14 may have a conveyor system, which may be a separate conveyor system or part of the conveyor system 24, for receiving a heated glass sheet G; and a bending apparatus 25, shown schematically in FIG. 1, for bending the glass sheet G. The bending apparatus 25 may include a movable first mold, such as an upper press mold; a movable second mold, such as a lower peripheral press ring, that may be moved horizontally toward and away from the press mold on a transport system, such as a shuttle; and one or more actuators for moving the press mold vertically relative to the conveyor system and the press ring, and/or for moving the shuttle and press ring vertically relative to the press mold. With such a configuration, the glass sheet G may be press bent between a curved surface of the upper press mold and the press ring. Additional details of example forming or bending stations are disclosed in U.S. Pat. Nos. 4,282,026 and 4,661,141, which are hereby incorporated in their entirety by reference.

At its downstream end, the bending station 14 may also include a door 26 that may be opened and closed to permit the quench ring 20 to be moved into the bending station 14 to receive a formed glass sheet G in preparation for quenching of the glass sheet G. For example, the quench ring 20 may be moved by an actuator 28 through a connection 30.

The quench apparatus 18 is configured to receive each glass sheet G from the bending station 14, and quench each glass sheet G for heat strengthening or tempering. The quench apparatus 18 includes lower and upper quench heads 32 and 34, respectively, that may each have the general shape of a glass sheet G to be quenched. Furthermore, the quench apparatus 18 is movable between an open position (shown partially in phantom lines), in which one or both of the quench heads 32 and 34 is/are moved away from the other/each other, and a closed position (shown in solid lines), in which one or both of the quench heads 32 and 34 is/are moved toward the other/each other. During movement of the quench ring 20 from the bending station 14 to the quench apparatus 18, the quench apparatus 18 may be in the open position, and then subsequently be moved to the closed position to commence quenching. As another example, the quench ring 20 may be moved from the bending station 14 to a position between the quench heads 32 and 34 when the quench apparatus 18 is in the closed position. The lower and upper quench heads 32 and 34, respectively, then provide upward and downward gas flows 36 and 38, respectively, that perform the quenching. For example, the quench apparatus 18 may cool each glass sheet G from an initial temperature in the range of 625-645° Celsius (C) to an exit temperature in the range of 200-400° C. Furthermore, the quench ring 20 may be oscillated back and forth (e.g., over a distance in the range of 1 to 2 inches) during a quenching operation to vary gas flow impingements on a particular glass sheet G.

Thereafter, the quench apparatus 18 may be moved to its open position, or remain in its closed position, and the actuator 28 may move the quench ring 20 to the exit cooling station 19. At the exit cooling station 19, lower and upper cooling heads 40 and 41, respectively, may provide upward and downward cooling gas flows 42 and 43, respectively, but at pressures that may provide lesser cooling power than prior quenching in the quench apparatus 18, in order to further cool a particular glass sheet G, such as down to a temperature at or near room temperature. The pressure of the upward gas flows 42 may be subsequently increased to lift the glass sheet G from the quench ring 20 upwardly against a transfer device 44, such as a conveyor, for moving the glass sheet G toward the right for further cooling and delivery. After the glass sheet G is lifted upwardly from the quench ring 20 in the exit cooling station 19, the actuator 28 moves the quench ring 20 back through the open or closed quench apparatus 18 to the bending apparatus 25 of the bending station 14 to receive another formed glass sheet G for subsequent movement back toward the right into the quench apparatus 18 in preparation for commencing the next cycle.

Figure 2:
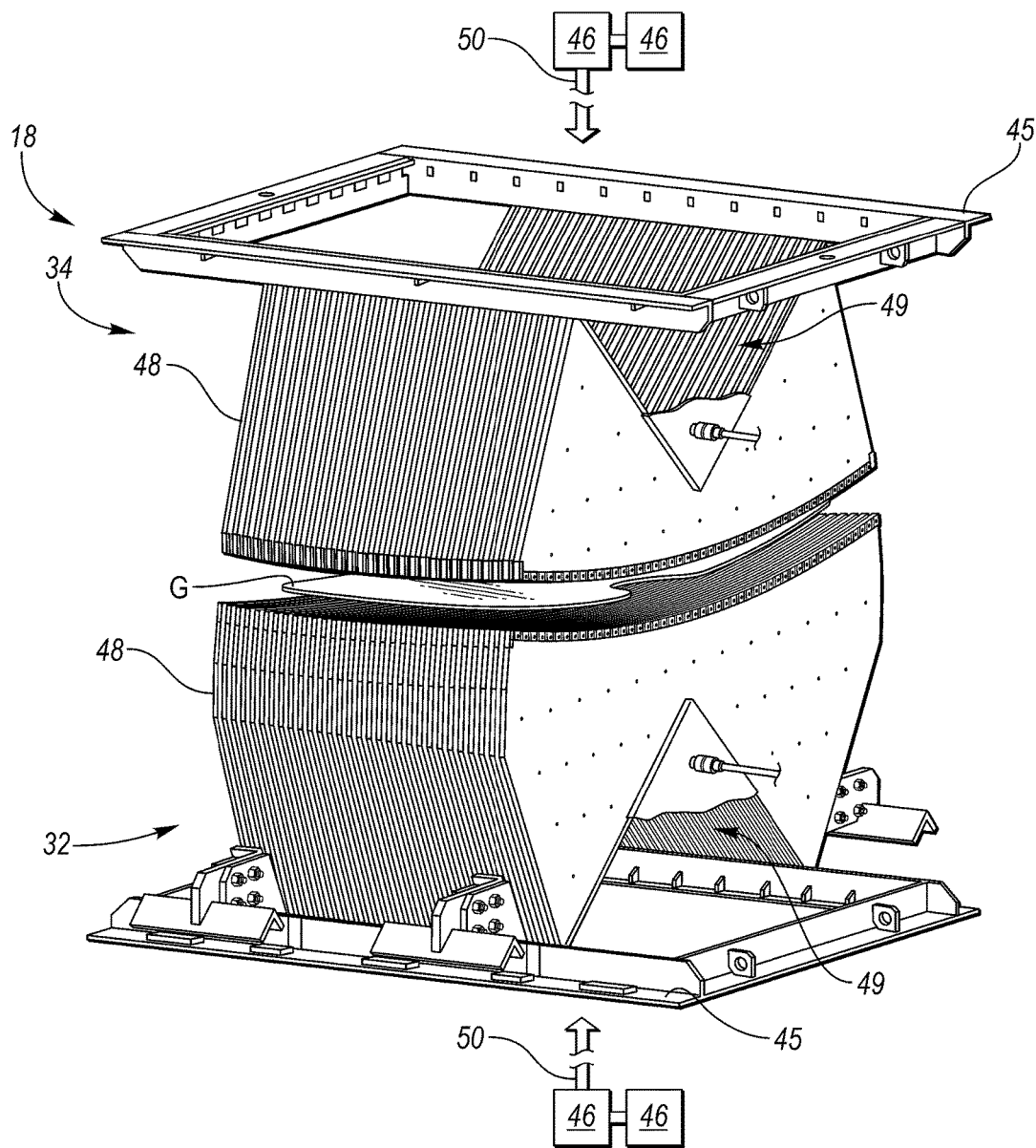
FIG. 2 is a perspective view of the quench station showing lower and upper quench heads of the quench station that each include a gas plenum and multiple quench fins in fluid communication with the gas plenum, wherein, for each quench head, a wall of the corresponding gas plenum is broken away to show an interior portion of the gas plenum.
Figure 3:
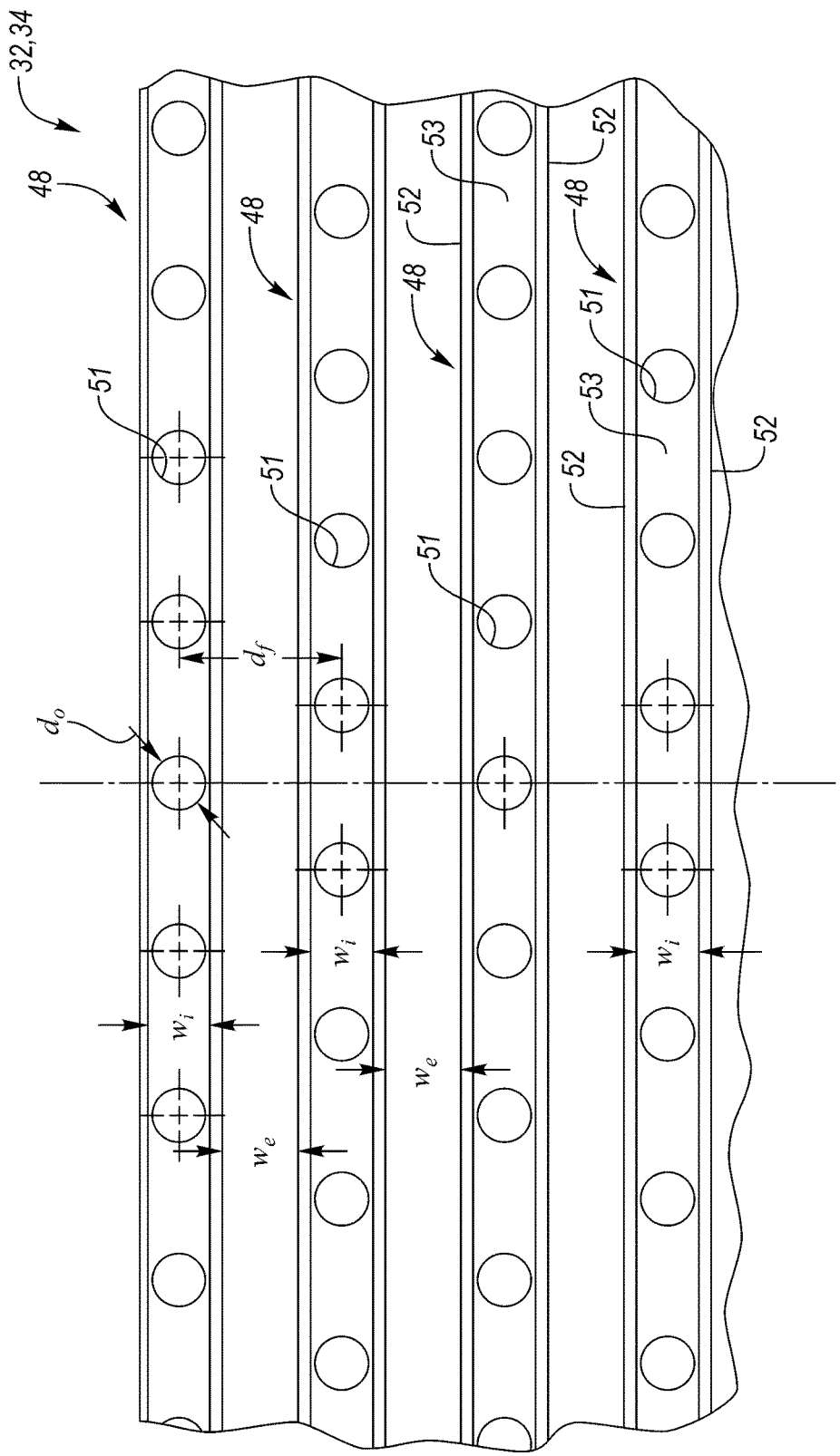
FIG. 3 is a partial plan view of a quench head that is representative of both the lower and upper quench heads.

Further details of the quench apparatus 18 will now be described in more detail with reference to FIGS. 2-4. Referring to FIG. 2, each quench head 32 and 34 may be connected to a movable support member, such as a frame 45, and each quench head 32 and 34 may receive gas (e.g., air) from one or more supply units 46 (e.g., fans or blowers) that may be connected in series, for example. Referring to FIGS. 2 and 3, each quench head 32 and 34 includes multiple quench bars or fins 48 connected to a particular frame 45, and each quench fin 48 is in communication with an open plenum 49 that receives gas from the supply unit(s) 46, such as through a gas supply passage 50 (e.g., duct or flow channel). Furthermore, each quench fin 48 includes multiple nozzles or outlet openings 51 for providing gas to a glass sheet G when the glass sheet G is positioned between the quench heads 32 and 34 and the quench apparatus 18 is in the closed position.

The quench heads 32 and 34 may be made of any suitable material and in any suitable manner. For example, each quench fin 48 may include two stamped sheet metal walls 52 that are connected with suitable fasteners, such as rivets, to an outlet beam 53 that defines the outlet openings 51.

For each quench head 32 and 34, the quench fins 48 have a width or thickness in the range of 0.375 to 0.625 inches, and adjacent quench fins 48 are spaced apart center to center by a distance $d_f$ in the range of 0.87 to 1.15 inches. In one embodiment, for example, adjacent quench fins 48 of each quench head 32 and 34 are spaced apart by a distance in the range of 0.93 to 1.05 inches. In yet another embodiment, adjacent quench fins 48 of each quench head 32 and 34 are spaced apart by 1.0 inch. Furthermore, each quench fin 48 may have a curved profile, such as shown in FIGS. 2 and 4, or a flat profile depending on whether the glass sheets to be quenched are curved or flat.

In the embodiment shown in FIG. 3, the outlet openings 51 of each quench fin 48 are arranged in a straight row or line (e.g., along a common axis of the quench fin 48), and each outlet opening 51 has a diameter $d_o$ in the range of 0.25 to 0.36 inches. In one embodiment, for example, the diameter of each outlet opening 51 of each quench fin 48 is in the range of 0.30 to 0.34 inches. In yet another embodiment, each outlet opening 51 has a diameter of 0.3125 inches. Furthermore, the outlet openings 51 of adjacent fins 48 may be aligned with respect to each other, or staggered with respect to each other as shown in FIG. 3.

Figure 4:
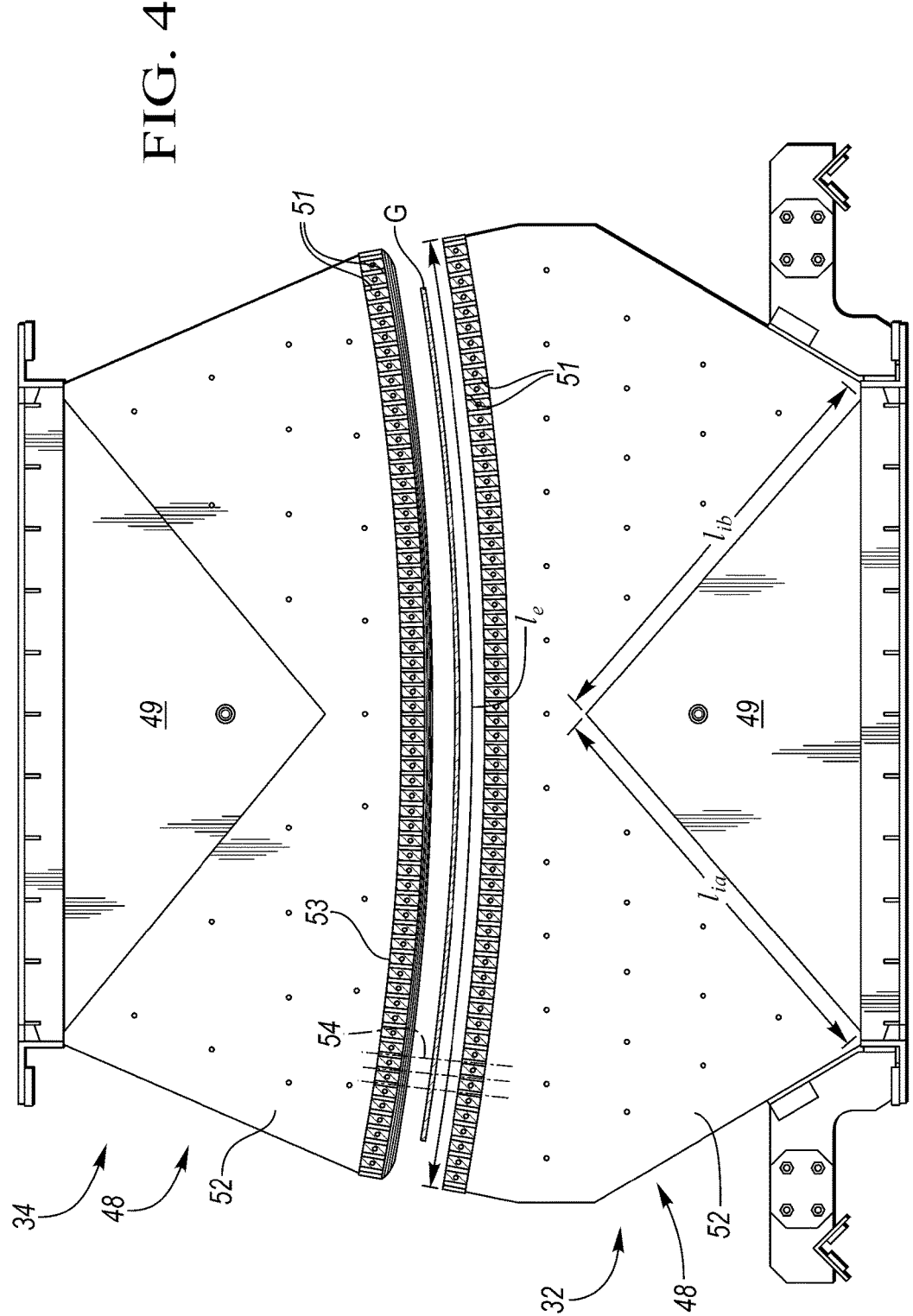
FIG. 4 is a cross-sectional view of the quench apparatus of FIG. 2 showing the quench heads in a closed position and a glass sheet positioned therebetween.
Figure 5:
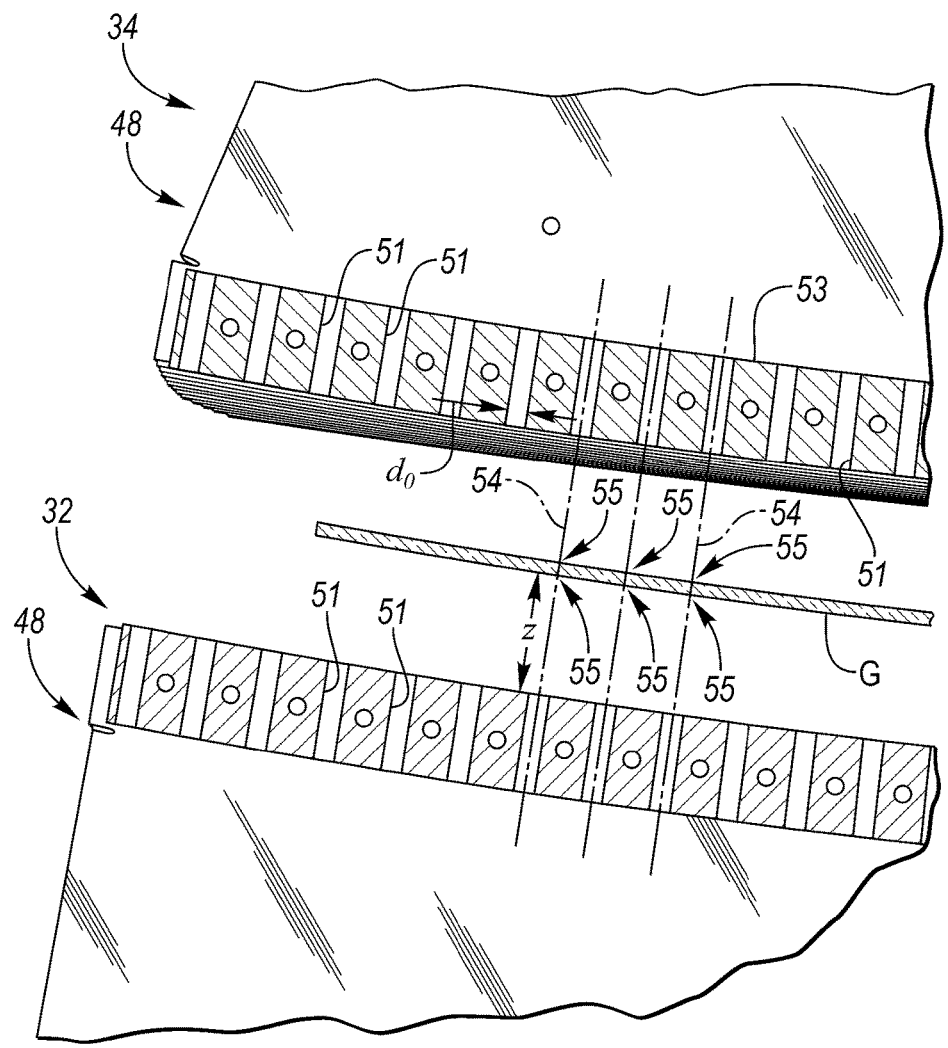
FIG. 5 is an enlarged view of a portion of the quench apparatus shown in FIG. 4.

Referring to FIGS. 4 and 5, each outlet opening 51 may be oriented such that a corresponding axis 54 extending through a center of the outlet opening 51 is arranged normal to a glass sheet G when the glass sheet G is positioned between the quench heads 32 and 34. In addition, for each quench fin 48, the outlet openings 51 are configured to provide spaced apart impingement points 55 on a glass sheet G, when the glass sheet G is positioned between the quench heads 32 and 34 and the quench heads 32 and 34 are in the closed position, such that adjacent impingement points 55 are spaced apart by a distance in the range of 0.82 to 1.15 inches. Each impingement point 55 may be defined by the intersection of a respective axis 54 at a respective surface of the glass sheet G. In one embodiment, the outlet openings 51 of each quench fin 48 are configured to provide the spaced apart impingement points 55 on the glass sheet G such that adjacent impingement points 55 are spaced apart by a distance in the range of 0.90 to 1.10 inches. In yet another embodiment, the outlet openings 51 of each quench fin 48 are configured to provide the spaced apart impingement points 55 on the glass sheet G such that adjacent impingement points 55 are spaced apart by 1 inch.

For flat portions of a quench fin 48 that are alignable with and configured to face corresponding flat portions of a glass sheet G, the spacing of adjacent outlet openings 51 in such flat portions of the quench fin 48 may be the same as the spacing of the corresponding adjacent impingement points 55 on the flat portions of the glass sheet G. Furthermore, such spacing may be independent of the spacing of the quench fin 48 away from the glass sheet G.

For curved portions of a quench fin 48 that are alignable with and configured to face corresponding curved portions of a glass sheet G, the spacing of adjacent outlet openings 51 in such curved portions of the quench fin 48 may be different than the spacing of the corresponding adjacent impingement points 55 on the curved portions of the glass sheet G. In that regard, the spacing of adjacent impingement points 55 on the curved portions of the glass sheet G may depend on the spacing of corresponding adjacent outlet openings 51 of the quench fin 48 as well as the spacing of the corresponding outlet openings 51 relative to the glass sheet G when the glass sheet G is positioned between the quench heads 32 and 34 and the quench heads 32 and 34 are in the closed position.

Thus, for example, the spacing of adjacent impingement points 55 mentioned previously may be based on a configuration in which each outlet opening 51 of each quench head 32 and 34 is spaced away from a glass sheet G by a distance in the range of 1.75 to 2.25 inches (e.g., about 2 inches), when the glass sheet G is positioned between the quench heads 32 and 34 and the quench heads 32 and 34 are in the closed position. As another example, the spacing of adjacent impingement points 55 may be based on a configuration in which the quench heads 32 and 34 are spaced away from each other by a distance in the range of 3.5 to 4.5 inches (e.g., 4 inches), when the quench heads 32 and 34 are in the closed position and the glass sheet G is positioned generally equidistantly between the quench heads 32 and 34.

Referring to FIGS. 3 and 4, each quench fin 48 has an inlet cross-sectional area IA through which gas is provided to the quench fin 48, and a total outlet area OA through which gas exits the quench fin 48 and moves toward a glass sheet G. In the illustrated embodiment, the IA of each quench fin 48 is defined by the portion of the quench fin 48 that intersects or interfaces with the corresponding plenum 49. For example, the IA may be defined by the sum of internal lengths $l_{ia}$ and $l_{ib}$ (shown in FIG. 4) of the quench fin 48 multiplied by an internal width $w_i$ (shown in FIG. 3). Furthermore, in the illustrated embodiment, the total outlet area OA of a particular quench fin 48 may be defined as the sum of all of the outlet areas of all of the outlet openings 51 of the quench fin 48. For each outlet opening 51, the corresponding outlet area is equal to $\pi(d_o/2)^2$.

Each quench head 32 and 34 also defines a total exhaust area EA between the corresponding quench fins 48, which is equal to the sum of the areas between adjacent quench fins 48 of a particular quench head 32, 34, and a total head outlet area HOA, which is equal to the sum of all outlet areas for the particular quench head 32, 34. Furthermore, the area between adjacent quench fins 48 is equal to an external length $l_e$ (shown in FIG. 4) of one of the quench fins 48 (assuming both quench fins 48 have the same length) multiplied by an external width $w_e$ (shown in FIG. 3) between the adjacent quench fins 48. For a quench fin 48 having a curved profile, the corresponding external length $l_e$, is the length along the entire curve.

In order to provide uniform distribution of gas (e.g., air) along the length of prior quench fins, a prior design strategy led to an increase in the ratio of inlet cross-sectional area IA to total outlet area OA above 6 to 1. For example, one prior design including quench fins having outlet openings that each have a diameter of 0.3125 inches, and that are configured to provide spaced apart impingement points on a glass sheet such that adjacent impingement points are spaced apart by a distance of 1.25 inches, provides an IA to OA ratio of about 6.10 to 1.

Likewise, in order to ensure that gas will be able to escape between adjacent quench fins in order to allow more gas from the outlet openings 51 to impact a particular glass sheet G and carry away heat, a prior design strategy led to an increase in the ratio of total exhaust area EA between the quench fins to total head outlet area HOA above 7 to 1. For example, the above prior design, in which adjacent quench fins of each quench head are spaced apart center to center by 1 inch, provides an EA to HOA ratio of about 7.74 to 1.

Surprisingly, however, the inventor of the inventions disclosed in the present application discovered that reducing the spacing between outlet openings on each quench fin 48 actually improved performance of the quench apparatus 18, even though both of the above ratios were reduced. For example, in one embodiment according to the present disclosure, in which, for each quench head 32, 34, the quench fin outlet openings 51 each have a diameter of 0.3125 inches, and the outlet openings 51 are configured to provide spaced apart impingement points on a glass sheet G positioned between the quench heads 32 and 34 such that adjacent impingement points are spaced apart by a distance of 1 inch when the quench heads 32 and 34 are spaced away from each other by 4 inches, the IA to OA ratio is about 4.89 to 1. Furthermore, in that same embodiment, in which adjacent quench fins 48 of each quench head 32 and 34 are spaced apart center to center by 1 inch, the EA to HOA ratio is about 6.19 to 1.

In another embodiment according to the present disclosure, in which, for each quench head 32, 34, the quench fin outlet openings 51 each have a diameter of 0.335 inches, and the outlet openings 51 are configured to provide spaced apart impingement points on a glass sheet G such that adjacent impingement points are spaced apart by a distance of 0.9375 inches when the glass sheet G is positioned between the quench heads 32 and 34 and the quench heads 32 and 34 are spaced away from each other by 4 inches, the IA to OA ratio is about 4.25 to 1. Furthermore, in that same embodiment, in which adjacent quench fins 48 of each quench head 32 and 34 are spaced apart center to center by 0.9375 inches, the EA to HOA ratio is about 4.12 to 1.

Generally, a quench apparatus according to the present disclosure may have an IA to OA ratio of at least 4 to 1. In one embodiment, the IA to OA ratio may be at least 4.2 to 1 and/or less than 5 to 1. In another embodiment, the IA to OA ratio may be at least 4.5 to 1 and/or less than 5 to 1.

Likewise, a quench apparatus according to the present disclosure may have an EA to HOA ratio of at least 4 to 1.

In one embodiment, the EA to HOA ratio may be at least 4 to 1 but less than 5 to 1. In another embodiment, the EA to HOA ratio may be at least 5.5 to 1 and/or less than 7 to 1. In yet another embodiment, the EA to HOA ratio may be at least 5.5 to 1 and/or less than 6.5 to 1.

Furthermore, in order to increase heat transfer during a quench operation, especially when quenching a relatively thin glass sheet (e.g., a glass sheet having a thickness in the range of 2.5 to 3.5 millimeters (mm), a prior strategy involved increasing system pressure in order to increase flow and heat transfer at the glass sheet to thereby establish a sufficient temperature profile through the entire thickness of the glass sheet. For example, output of gas supply units, such as fans, may be increased by increasing fan speed, further opening inlet vanes, and/or increasing fan size to thereby increase system pressure.

With embodiments according to the present disclosure, the inventor discovered that system or head pressure could actually be reduced compared to prior quench apparatuses, while providing increased flow through the quench fins 48 and outlet openings 51, thereby increasing heat transfer at glass sheets G. Lower pressure in the quench fins 48 may also lead to reduced impingement force on glass sheets G during quenching (i.e., "gentle" quenching or tempering), which may result in less negative effects on the glass sheets G. As a result, higher-quality glass sheets may be produced with this so-called "gentle temper."

In addition, because the quench apparatus 18 may provide larger quench flow, which reduces overall quench time, the initial temperature of glass sheets G upon entry into the quench apparatus 18 may be lower compared with prior quench apparatus designs. As a result, operating costs for the furnace 12 and/or bending station 14 may be reduced.

As another example, system or head pressure may be reduced with the quench apparatus 18, while still providing similar gas flow volumes at a glass sheet as compared to a prior quench apparatus operated at higher system or head pressures (e.g., operated with larger fans and/or higher fan speed). As a result, the quench apparatus 18 may enable sufficient quenching of the same size (e.g., same thickness) glass sheets that were previously quenched in an apparatus having higher manufacturing costs and/or operating costs.

Generally, by increasing the number of outlet openings and the effective outlet area compared to prior quench apparatuses, heat transfer rate may be increased while reducing power consumption. In that regard, as the number of outlet openings is increased, gas flow, heat transfer and power required may all increase in a linear fashion. Therefore, with a 25% increase in the number of outlet openings 51 compared to a prior quench apparatus, for example, heat transfer may be increased by approximately 25% along with a 25% increase in power required. In order for the prior quench apparatus to provide the same 25% increase in heat transfer, however, it would take approximately a 100% increase in pressure and a corresponding 182% increase in power consumption.

Furthermore, with the above embodiments according to the present disclosure, the outlet openings 51 may be configured to provide gas distribution areas or zones on a glass sheet G (which may each be represented as a circular area on the glass sheet G having a distribution or average diameter), such that there is minimal or no overlap between adjacent distribution zones. As a result, heat transfer efficiency may be optimized.

The size of an impingement zone for a particular outlet opening 51 depends on spacing between the outlet opening 51 and a particular glass sheet G (shown as distance z in FIG. 5), as well as the size of the outlet opening 51 (e.g, diameter $d_o$). In that regard, as gas (e.g., air) leaves a round cylindrical outlet opening 51, it is no longer constrained by the walls that define the outlet opening 51. As a result, the gas expands outwardly (e.g., at roughly a 7° angle) until it contacts the glass sheet G and defines an impingement zone. Furthermore, as the gas expands outwardly, the gas velocity at a central line of gas flow (e.g., along axis 54) eventually diminishes.

For each outlet opening 51, the size of the corresponding impingement zone is therefore dependent upon the glass spacing distance to diameter ratio, e.g., z to $d_o$ ratio. In one embodiment according to the present disclosure, the z to $d_o$ ratio may be at least 4 to 1 and/or not greater than 6.5 to 1. In another embodiment, the z to $d_o$ ratio may be at least 5 to 1 and/or not greater than 6.5 to 1. In yet another embodiment, the ratio may be at least 4.8 to 1 and/or not greater than 6.4 to 1.

Figure 6:
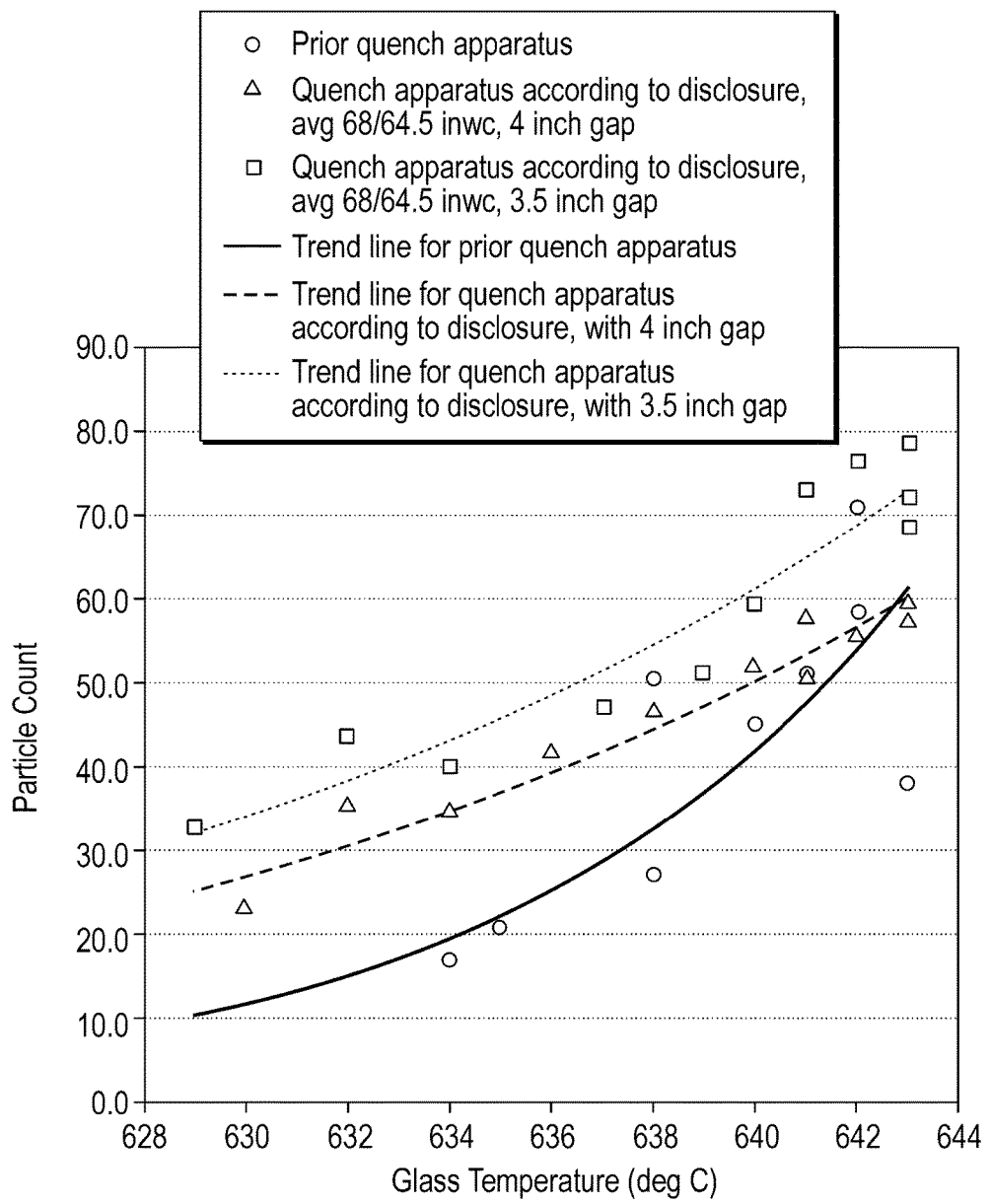
FIG. 6 is a graph showing glass particle count test results for various glass sheets quenched by a quench apparatus according to the present disclosure compared to glass particle count test results for various glass sheets quenched by a prior quench apparatus.

With any of the above embodiments according to the present disclosure, lower pressure gas may be supplied to the quench fins 48, as well as by the outlet openings 51 to each glass sheet G. For example, gas pressure supplied to the quench apparatus 18 may be in the range of 60 to 80 inches of water column (inwc). As a result, as mentioned above, the quench apparatus 18 may produce less negative effects on the glass sheets G, while still achieving sufficient tempering of the glass sheets G. In that regard, glass sheets tempered by a quench apparatus according to the present disclosure yielded glass particle count test results that were higher than or similar to test results for glass sheets tempered with a prior quench apparatus that used higher pressures. Referring to FIG. 6, for example, it can be seen that 2.8 mm thick glass sheets having initial temperatures in the range of about 629° C. to 643° C. and quenched by a quench apparatus according to the present disclosure (having, for each quench head, quench fin spacing of 1 inch center-to-center, outlet opening diameter of 0.3125 inches, and glass sheet impingement point spacing of 1 inch based on 4 inch quench head spacing), which was operated at an average gas pressure of 68 inwc for the upper quench head and 64.5 inwc for the lower quench head, provided higher or similar glass particle count test results as compared to glass sheets quenched by a prior apparatus (having, for each quench head, quench fin spacing of 1 inch center-to-center, outlet opening diameter of 0.3125 inches, and glass sheet impingement point spacing of 1.25 inches based on 4 inch quench head spacing), which was operated at an average gas pressure of 77 inwc for the upper quench head and 74 inwc for the lower quench head. In addition, when the spacing of the quench heads of the quench apparatus according to the present disclosure was changed to 3.5 inches, the particle count test results for quenched glass sheets were even higher compared to test results for glass sheets quenched by the prior quench apparatus having 4 inch quench head spacing.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, a quench apparatus according to the present disclosure may be used with any suitable glass processing system, such as a system provided with or without a bending station.

What is claimed is:

1. A glass quench apparatus comprising:
lower and upper quench heads configured to supply upward and downward gas flows to a heated glass sheet, each quench head comprising multiple quench fins for distributing gas, wherein, for each quench head, adjacent quench fins are spaced apart center to center by a distance in the range of 0.87 to 1.15 inches, and each quench fin has multiple outlet openings that each have a diameter in the range of 0.25 to 0.36 inches, wherein, for each quench fin, the outlet openings are configured to provide spaced apart impingement points on the glass sheet such that adjacent impingement points are spaced apart by a distance in the range of 0.82 to 1.15 inches, wherein each quench fin defines an inlet cross-sectional area, and the outlet openings for each quench fin have a combined total outlet area, and wherein, for each quench fin, the ratio of the inlet cross-sectional area to the total outlet area is at least 4 to 1 and less than 5 to 1.

2. The glass quench apparatus of claim 1 wherein, for each quench head, the outlet openings of adjacent quench fins are staggered with respect to each other.

3. The glass quench apparatus of claim 1 further comprising a quench ring for receiving the glass sheet, the quench ring being configured to position the glass sheet between the quench heads.

4. The glass quench apparatus of claim 1 wherein, for each quench fin, the ratio of the inlet cross-sectional area to the total outlet area is at least 4.5 to 1.

5. The glass quench apparatus of claim 1 wherein each quench head defines a total exhaust area between the quench fins, and the outlet openings for each quench head have a combined total head outlet area, and wherein, for each quench head, the ratio of the exhaust area to the total head outlet area is at least 4 to 1.

6. The glass quench apparatus of claim 5 wherein, for each quench head, the ratio of the exhaust area to the total head outlet area is less than 7 to 1.

7. The glass quench apparatus of claim 6 wherein, for each quench head, the ratio of the exhaust area to the total head outlet area is at least 5.5 to 1.

8. The glass quench apparatus of claim 1 wherein, for each quench head, adjacent quench fins are spaced apart center to center by a distance in the range of 0.93 to 1.05 inches.

9. The glass quench apparatus of claim 8 wherein the diameter of each outlet opening of each quench fin is in the range of 0.30 to 0.34 inches.

10. The glass quench apparatus of claim 8 wherein, for each quench fin, the outlet openings are configured to provide the spaced apart impingement points on the glass sheet such that adjacent impingement points are spaced apart by a distance in the range of 0.90 to 1.10 inches.

11. The glass quench apparatus of claim 10 wherein the diameter of each outlet opening of each quench fin is in the range of 0.30 to 0.34 inches.

12. The glass quench apparatus of claim 11 wherein, for each quench head, the outlet openings of adjacent quench fins are staggered with respect to each other.

13. The glass quench apparatus of claim 12 wherein, for each quench fin, the ratio of the inlet cross-sectional area to the total outlet area is at least 4.2 to 1.

14. The glass quench apparatus of claim 13 wherein each quench head defines a total exhaust area between the quench fins, and the outlet openings for each quench head have a combined total head outlet area, and wherein, for each quench head, the ratio of the exhaust area to the total head outlet area is at least 4 to 1, but less than 5 to 1.

15. The glass quench apparatus of claim 13 wherein each quench head defines a total exhaust area between the quench fins, and the outlet openings for each quench head have a combined total head outlet area, and wherein, for each quench head, the ratio of the exhaust area to the total head outlet area is at least 5.5 to 1, but less than 6.5 to 1.

16. The glass quench apparatus of claim 13 further comprising a quench ring for receiving the glass sheet, the quench ring being configured to position the glass sheet between the quench heads.

17. The glass quench apparatus of claim 1 wherein each outlet opening is configured to be spaced away from the glass sheet by a distance z when the glass sheet is positioned between the quench heads and the quench apparatus is in a closed position, and wherein, for each outlet opening, the ratio of the distance z to the outlet opening diameter is at least 4 to 1, but not greater than 6.5 to 1.

18. The glass quench apparatus of claim 1 further comprising lower and upper plenums configured to supply gas to the lower and upper quench heads, respectively, wherein each quench fin of the lower quench head has an open-ended portion that interfaces with the lower plenum, and each quench fin of the upper quench head has an open-ended portion that interfaces with the upper plenum, and wherein the inlet cross-sectional area of each quench fin is defined by the portion of the quench fin that interfaces with the respective plenum.

19. The glass quench apparatus of claim 1 wherein each quench fin includes two side walls that are spaced apart by an internal width, each sidewall has first and second angled end edges having first and second lengths, respectively, and each end edge is spaced away from the outlet openings of the quench fin, and wherein, for each quench fin, the inlet cross-sectional area is based on the sum of the first and second lengths of one of the sidewalls multiplied by the internal width.

20. A glass quench apparatus comprising:
lower and upper quench heads configured to supply upward and downward gas flows to a heated glass sheet, each quench head comprising multiple quench fins for distributing gas, wherein, for each quench head, adjacent quench fins are spaced apart center to center by a distance in the range of 0.87 to 1.15 inches, and each quench fin has multiple outlet openings that each have a diameter in the range of 0.25 to 0.36 inches, wherein, for each quench fin, the outlet openings are configured to provide spaced apart impingement points on the glass sheet such that adjacent impingement points are spaced apart by a distance in the range of 0.82 to 1.15 inches when the glass sheet is positioned between the quench heads and the quench heads are spaced away from each other by 4 inches, and wherein each quench fin defines an inlet cross-sectional area, and the outlet openings for each quench fin have a combined total outlet area, and wherein, for each quench fin, the ratio of the inlet cross-sectional area to the total outlet area is at least 4 to 1 but less than 5 to 1.

21. The glass quench apparatus of claim 18 wherein each quench fin includes two spaced apart side walls that are connected to an outlet member that defines the outlet openings for the quench fin.

22. The glass quench apparatus of claim 20 wherein, for each quench fin, the ratio of the inlet cross-sectional area to the total outlet area is at least 4.5 to 1.

23. A glass quench apparatus comprising:

lower and upper quench heads configured to supply upward and downward gas flows to a heated glass sheet, each quench head comprising multiple quench fins for distributing gas, wherein, for each quench head, adjacent quench fins are spaced apart center to center by a distance in the range of 0.87 to 1.15 inches, and each quench fin has multiple outlet openings that each have a diameter in the range of 0.25 to 0.36 inches, wherein, for each quench fin, the outlet openings are configured to provide spaced apart impingement points on the glass sheet such that adjacent impingement points are spaced apart by a distance in the range of 0.82 to 1.15 inches, wherein each quench fin defines an inlet cross-sectional area through which gas may be provided to the quench fin, and the outlet openings for each quench fin have a combined total outlet area such that, for each quench fin, the ratio of the inlet cross-sectional area to the total outlet area is at least 4 to 1 and less than 5 to 1, and wherein each quench head defines a total exhaust area between the quench fins, and the outlet openings for each quench head have a combined total head outlet area such that, for each quench head, the ratio of the exhaust area to the total head outlet area is at least 4 to 1; and a quench ring for receiving the glass sheet, the quench ring being configured to position the glass sheet between the quench heads.

\* \* \* \* \*